United States Patent [19]
Hartmann

[11] 3,912,396
[45] Oct. 14, 1975

[54] ELECTRONIC LENS TESTER

[75] Inventor: Rudolf Hartmann, Skokie, Ill.

[73] Assignee: Bell & Howell Company, Chicago, Ill.

[22] Filed: May 23, 1973

[21] Appl. No.: 363,087

[52] U.S. Cl. .............................................. 356/124
[51] Int. Cl. ........................................... G01b 9/00
[58] Field of Search .......... 356/124, 125, 126, 127, 356/121

[56] References Cited
UNITED STATES PATENTS
3,519,358   7/1970   Kuttner et al. ..................... 356/124
3,743,427   7/1973   Weiser ................................ 356/124

OTHER PUBLICATIONS
Herriott, "Recording Electronic Lens Bench," 48JOSA 968.

*Primary Examiner*—Ronald J. Stern
*Assistant Examiner*—Conrad Clark
*Attorney, Agent, or Firm*—John E. Peele, Jr.; John R. Hoffman; Roger M. Fitz-Gerald

[57] ABSTRACT

An apparatus for measuring the modulation transfer function of an image-forming lens or lens system. The apparatus uses an object target which is of the type having parallel light lines on a dark background. The object target is illuminated and the lens is mounted, e.g. an equal number of focal lengths from the target, to focus an image at an image plane. An opaque plate member having an elongate narrow slit parallel to the light lines is mounted at the image plane for lateral movement of the slit at a uniform speed across the image plane. The differences in illumination at the slit, particularly as the slit travels from dark to light and light to dark areas of the image, is detected by a photoelectric converter which outputs an electrical signal defining the modulation properties of the lens. The signal can be amplified and read out in an oscilloscope for visual examination or compared with standard signals in a computer.

15 Claims, 2 Drawing Figures

3,912,396

ELECTRONIC LENS TESTER

BACKGROUND OF THE INVENTION

1. Field of the Invention

This invention relates to apparatus for measuring the image-forming quality of optical systems, particularly real image-forming lens systems.

2. Brief Description of the Prior Art

The image evaluation method which is most widely accepted as the most meaningful evaluation is the modulation transfer function (MTF) test. The MTF test takes into consideration both the resolving power of the test lens and the contrast in the image being resolved.

Conventionally, in testing lenses for MTF, a test image is projected through the lens and the light distribution in the projected image is determined. The deviation in the light distribution from the light distribution in the projected test image is determinative of image deterioration which is generally due to aberrations, tolerance effects or manufacturing defects in the lens.

Conventional lens inspection methods have relied on visual subjective evaluation. In such inspection methods, the test lens is used to project a magnified image of a pattern onto a large screen where an observer reads the resolving power and judges the image contrast by evidence of non-image forming light, i.e., flare surrounding the image. Such a test method is highly subjective and is subject to a variety of interpretations on the part of the observer or inspector. Even so, such methods have been used successfully over a number of years and afford a relatively fast quality assessment of the test lens.

More recently, methods have developed which employ photoelectric detection and eliminate the subjectivity and interpretation of an observer. Although apparently the best methods currently available, the present MTF systems have a major drawback in that only one point in the test pattern or format covered by the lens is measured at a given time. Since image quality can vary greatly between the center and edge of the field and between diametrically oppossed points off-axis by the same distance due to decentration, a large number of MTF measurements are required to really assess the lens performance. Such a large number of measurements is time consuming and costly.

SUMMARY OF THE INVENTION

The present invention involves the use of an elongate narrow slit which is bodily moved at a uniform or constant rate through the entire dimension of the projected image. The slit is backed by a photoelectric converter which converts deviations in light distribution at the slit during scanning into electrical signals which can be amplified and read out.

One improvement in the present system is the use of a plurality of test patterns which are staggered parallel to the length of the slit in the projected image. The test patterns are also laterally staggered from each other in the direction of the movement of the slit. Such test patterns permit the separate scanning of images projected by different portions of the lens since the slit sees only the lines of one test pattern at a time. This permits testing of the entire image format with one sweep of the slit. No lens rotation is necessary since decentration is detected by trace amplitude differences of diametrically opposed patterns. Additionally, tangential and radial orientations can be tested at the same time as axial orientation in a given lens, i.e., during the same sweep of the slit.

As another improvement, a preferred simplified device is provided in which the only moving part is the sliding slit and in which no auxiliarly optics are used. This device uses an illuminated object target having spaced light lines on a dark or opaque background. The test lens is releasably mounted at a position a plurality of complete focal lengths from the object target or grate with the lines of the target or grate parallel to the narrow slit. The narrow slit is slidably mounted in the image plane and is backed by a photoelectric converter which converts detected deviations in light distribution into an electrical signal output. Except for the lens being tested there are no optical components in the system which might affect the results due to their own imperfections.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

DESCRIPTION OF THE PREFERRED EMBODIMENT

Figure 1:
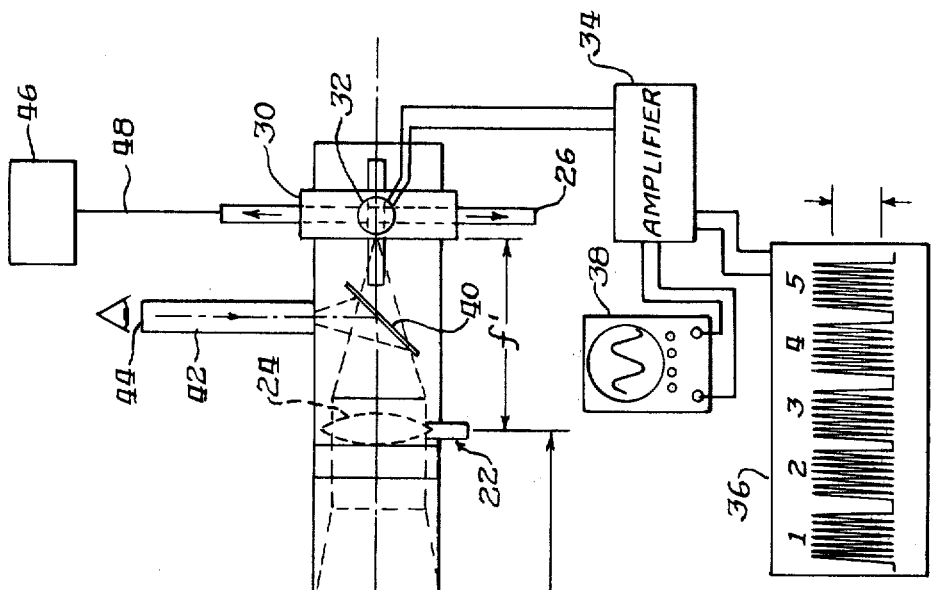
FIG. 1 is a schematic plan view of a form of the lens testing system of the present invention.

Turning first to FIG. 1, the illustrated system includes an elongate frame member 10 having mounted thereon an illuminated object source in the form of a light box 12. Light box 12 has a translucent or frosted glass front plate 14 and contains a suitable light source for transilluminating the target. Releasably secured to glass plate 14 is the test object or target 16 which is a transparent sheet 18 having printed grates 20a through 20e. Each grate constitutes a separate and individual test pattern having known spatial frequencies and each is made up of a plurality of vertical parallel white lines on a black background. The white lines are of sufficient width to fill the slit at the image plane. The black and white areas of the target have a known or predetermined contrast ratio so that the target provides a known input to be compared with the contrast in the lens image. The target can provide a single spatial frequency or changing frequency, e.g. ascending or descending, based on a given specific formula. A large variety of target forms will be apparent to those skilled in the art.

A lens holder 22 is mounted on frame 10 for releasably holding a test lens 24 at a position spaced from the target 16 for focusing an image of the target. For example, the lens holder may be a plurality of focal lengths or known magnifications from the target 16. In the system shown, the test lens is mounted about 100 focal lengths from target 16. Preferably, the distance from the target should be at least about 20 focal lengths when testing lenses for general photographic applications. The greater distances permit more accurate determination of lens quality for normal photographic cameras or projection lenses. Obviously, lenses for finite conjugate applications such as enlarging or microfilm lenses can also be accommodated.

Figure 2:
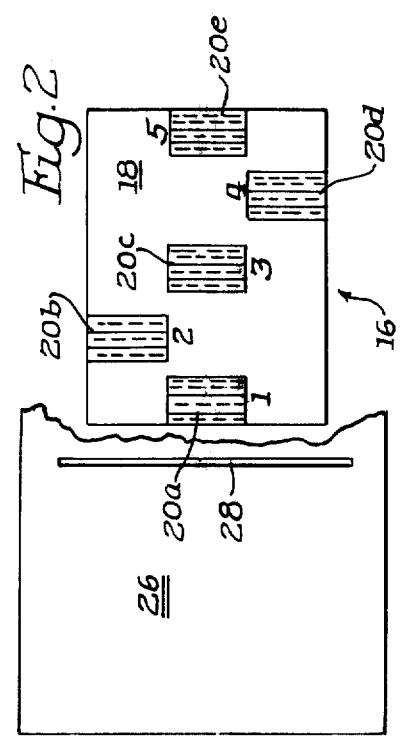
FIG. 2 is a diagramatic showing which illustrates the position of the scanning slit relative to the test patterns on the object target and in the projected image.

An opaque plate 26 having a vertical slit 28 is mounted for lateral sliding movement in or at the image plane one focal length behind lens 24 by plate holder 30 which is mounted on frame 10. FIG. 2 shows the relative positions of the slit 28 and the image in the image plane prior to a sweep by the slit across the plane. A photoelectric converter such as photocell 32 is mounted on the back face of plate 26 at slit 28 to detect variations in brightness of the image as the slit moves across the image plane. The photoconverter 32 converts the detected light into electrical signals which are amplified by amplifier 34 and either compared with standard signals by a computer 36 or are delivered to an oscilloscope 38 for visual observation in the form of square waves. The use of an oscilloscope is preferred for fast readout. The object test patterns have constant modulation (100 percent) so that the relative amplitude heights between the pattern groups in the image are a measure of image quality or modulation.

The device is also provided with a system for visually monitoring the image at the image plane. Accordingly, an interposable opaque or stationery semi-transparent mirror 40 is provided between the test lens 24 and the slit 28 for diverting the image into an interposing microscope 42 having eye piece 44 through which the image can be observed.

A constant-speed motor 46 and drive train 48 are provided to move the plate 26 and slit 28 at a uniform speed during scanning of complete image format in either direction. A suitable drive system is described in more detail in Kuttner et al. U.S. Pat. No. 3,519,358, issued July 7, 1970. As the slit scans from left to right in FIG. 2, it scans each of grates 20a through 20b separately and, thus, the output from the photocell 32 pertains to five pre-selected different field positions. Although the test pattern shown does not correspond to conventionally used radial and tangential orientations, in use in the present system, the pattern does test such orientations. Grates 20a and 20e correspond to tangential lines. Grates 20b and 20d are about midway between radial and tangential orientation and for grate 20c, on axis, the orientation is theoretically not relevant.

The invention is not limited to the test pattern shown. For example, a larger or lesser number of staggered grates may be used. Other shapes such as diagonal lines may be used although the slit may have to be reoriented to be parallel to the grate lines. Desirably, each white line and each black space between the lines should be wide enough to provide an image substantially larger than the slit and preferably, the finest image of the spatial frequency of interest should be at least three times as wide as the slit.

The device is very versatile. The light box 12, lens holder 22 and plate holder 30 are all slidably mounted on frame 10 so that they can be moved toward and away from each other to accommodate lenses of differing focal lengths. Also, depth of field tests can easily be made simply by changing the distance of the test object 16 from the test lens 24.

Advantageously, the present system permits an entire image format to be tested in one sweep of the slit across the image plane. No lens rotation is needed; nor are auxiliary optics. Test objects or targets can be easily made and the spacing or width of the lines is not as critical as it would be if the target were in the image plane, i.e., the short conjugate position. The sliding slit is the only moving mechanism and the system can be simply and easily operated and at a low cost and low maintenance. The device permits quick inspection of test lenses and is adaptable to a wide range of focal lengths and formats. Further, relative focal plane illumination measurements can be performed simultaneously with the performance testing.

I claim:

1. A device for determining the image forming quality of a lens which comprises an object target having a plurality of individual and separate grate patterns with parallel grate lines, means for removeably mounting the test lens for focusing the object grate as an image at an image plane, a slit located at the lens image plane, means mounting said slit for lateral movement relative to the target and along and at the image plane with the slit parallel to the target grate lines, and means for detecting lens modulation as changes in image illumination at said slit during movement of said slit, said separate patterns being arranged in alternate rows along said object target in the direction of movement of said slit and each of said patterns defining only a portion of the lens field of view in the direction of the length of the slit and being imaged in only a portion of the image plane along the length of the slit.

2. The device of claim 1 wherein said patterns are located along the length of the slit such that only one of said plurality of grate patterns appears in said slit at a given time.

3. The device of claim 2 wherein each of said patterns defines a distinct and nonoverlapping portion of the image plane along the length of the slit.

4. The device of claim 1 wherein said object target is trans-illuminated and planar.

5. The device of claim 1 wherein said detecting means comprises photoelectric means mounted behind the slit for detection of differences in illumination as the slit transverses the image plane and for translating said variations into electrical signals, and readout means for converting the electrical signals to a legible form.

6. The device of claim 5 wherein said readout means comprises an amplifier for receiving and amplifying said electrical signals and oscilloscope means for transforming the amplified signals into a visible wave pattern.

7. The device of claim 1 including means for visually observing the image appearing at the image plane.

8. The device of claim 1 including means for moving said slit in the image plane at a constant or uniform speed.

9. A device for determining the image forming quality of a lens which consists essentially of means defining an illuminated object target having parallel laterally spaced light grate lines forming a non-overlapping pattern on a dark background, means for removeably mounting a lens to be tested, means defining a narrow slit parallel to said spaced lines mounted for lateral movement at a constant or uniform rate within and at and across the width of the lens image plane for scanning only one pattern of the image at a given time, photoelectric means mounted behind said slit for detecting changes in illumination as the slit transverses the image and for translating variances in illumination across said image into electrical signals, and readout means for converting the electrical signals into a legible form.

10. The device of claim 9 wherein said lens mounting means mounts the lens at a position a plurality of complete focal lengths or known magnifications from said object.

11. The device of claim 9 including means for visually observing the image appearing at the image plane.

12. The device of claim 9 wherein said object target comprises a plurality of individual legible grate patterns arranged in alternate rows in the direction of movement of said slit, each of said patterns defining only a portion of the lens field of vision and only a portion of the image plane along the length of the slit.

13. The device of claim 9 wherein the illuminated object target comprises a light box having a transparent surface for projection of light therefrom and a transparent overlay for said surface containing said object grate lines imprinted thereupon.

14. A device for determining the image forming quality of a lens which comprises a light box having a transparent planar surface for projection of light therefrom, a transparent overlay for said surface containing an object target having a predetermined contrast ration imprinted thereupon, said target having parallel spaced light lines on an appreciably darker background, means for removeably mounting a lens to be tested at a position a plurality of whole focal lengths from said object, means defining a narrow slit parallel to said grates mounted for lateral movement in the lens image plane for scanning the image at the image plane, means for moving said slit at constant or uniform speed, photoelectric detector means mounted behind the slit for detection of differences in illumination of the slit as the slit transverses the image plane and for translating said variations into electrical signals, an amplifier for receiving and amplifying said electrical signals, oscilloscope means for transforming the amplified signals into a visible wave form, said separate grating patterns being arranged in alternate rows along said object source in the direction of movement of said slit and each of said patterns defining only a portion of the lens, field of vision and image plane along the length of the slit, each of said patterns being arranged in alternate rows along the length of the slit, and each of said patterns defining a separate and distinct and nonoverlapping portion of the image plane along the length of the slit, and means for visually observing the image appearing at the image plane.

15. The device of claim 14 wherein said oscilloscope means transforms the signals into wave forms ranging from sine wave forms to square wave forms.

* * * * *